(12) United States Patent
Lucchetti

(10) Patent No.: US 6,931,971 B2
(45) Date of Patent: Aug. 23, 2005

(54) LASER-BASED JAW SETTING DEVICE

(76) Inventor: Richard L. Lucchetti, 6107 Londonderry Dr., Cary, IL (US) 60013

( * ) Notice: Subject to any disclaimer, the term of this patent is extended or adjusted under 35 U.S.C. 154(b) by 461 days.

(21) Appl. No.: 10/127,046

(22) Filed: Apr. 20, 2002

(65) Prior Publication Data

US 2003/0198274 A1 Oct. 23, 2003

(51) Int. Cl.$^7$ ........................... B23B 23/12; B23B 25/06
(52) U.S. Cl. ........................................... 82/118; 279/156
(58) Field of Search .......................... 82/1.11, 111, 120, 82/121, 152; 239/126, 156, 110, 158; 33/286

(56) References Cited

U.S. PATENT DOCUMENTS

| | | | |
|---|---|---|---|
| 3,749,500 A | 7/1973 | Carlson et al. | |
| 4,417,816 A | * 11/1983 | Kindl et al. | ................. 356/357 |
| 4,438,567 A | 3/1984 | Raiha | |
| 4,566,202 A | 1/1986 | Hamar | |
| 4,966,460 A | 10/1990 | Kahley | |
| 5,442,565 A | * 8/1995 | Galel | ........................... 82/1.1 |
| 5,448,361 A | * 9/1995 | Patton | ........................ 356/384 |
| 5,594,993 A | 1/1997 | Tager et al. | |
| 5,816,986 A | 10/1998 | Luecke et al. | |
| 6,263,584 B1 | 7/2001 | Owens | |

* cited by examiner

Primary Examiner—Wilmon Fridie, Jr.
(74) Attorney, Agent, or Firm—Mathew R. P. Perrone, Jr.

(57) ABSTRACT

A laser-based jaw setting device for an accurate work holding jaw placement on a lathe, wherein the laser-based jaw setting device has a housing with a laser diode, an internal battery supply, and an operating switch mounted therein; and further having a main mounting plate secured to housing in order to releasably secure the laser-based jaw setting device to the desired lathe, especially a computer numeric controlled lathe.

18 Claims, 4 Drawing Sheets

LASER-BASED JAW SETTING DEVICE

This invention relates to a laser-based jaw setting device, and more particularly to a laser-based jaw setting device providing for proper mounting of jaws on a lathe, especially as such mounting relates to a computer numeric controlled lathe.

BACKGROUND OF THE INVENTION

With the advent of the computer numeric controlled lathe, great advances are commonplace in the machine tool industry. Yet, at least one difficulty remains. The placement of work holding jaws on the computer numeric controlled lathe is still an art. Even a skilled tool maker cannot always place the jaws thereon correctly the first time. Yet, it is a requirement that the jaws be placed correctly in an order to get a proper product.

The computer numeric controlled lathe provides for very efficient formation of products, assuming for the sake of argument, that the work holding jaws are properly placed thereon. It is not always possible to leave the same set of work holding jaws on a lathe until a project is finished.

Many times, the work holding jaws on a computer numeric controlled lathe must be changed before a project is finished. When it is desired to finish or return to that project, the jaws must be precisely repositioned on the lathe in substantially the same place as the first placement of the jaws on the lathe. If such placement cannot be obtained, the project or product will not be effectively finished. It may even be required to start a project over, if the second placement of the jaws does not substantially duplicate the first placement of the jaws on the chuck.

Many devices are known to assist with the preparation of the lathe, and in particular the attachment of the work holding jaws thereto. Unfortunately, the devices of the prior art, which assist in the mounting of the work holding jaws, tend to cause more problems than they solve.

Some of the devices are too bulky to be used efficiently. A bulky device cannot be handled easily or used effectively. Thus, the desired simplification for the jaw mounting is not achieved.

Other prior art devices require too many steps to be used efficiently. For example, the use of the device does not greatly reduce the time required to install the jaws, when the jaws are placed on the computer numeric controlled lathe by a skilled worker.

Thus, while the computer numeric controlled lathe is a great advance in the machine industry, the complexities of mounting the work holding jaws thereon mitigate against the use thereof. It is very desirable to provide a device, which may be easily attached to that machine and simply used, while thereby greatly simplifying attachment of work holding jaws to the lathe.

If such a device may be simply used and moved from machine to machine, or lathe to lathe, even an expensive jaw positioning device can be effectively used in a machine shop. Then, this device may be used on a machine until the jaws are mounted thereon and then moved to another machine. The sequence repeats itself until all machines have a desired set of jaws mounted thereon or otherwise secured thereto. However, the simple use and transfer of the device from lathe to lathe are not permitted with the jaw mounting devices of the prior art.

SUMMARY OF THE INVENTION

Among the many objectives of this invention is the provision of a laser-based jaw setting or mounting device, which is easily transported between or from one lathe to another.

A further objective of this invention is the provision of a laser-based jaw setting device, which is easily used.

Yet a further objective of this invention is the provision of a laser-based jaw setting device, which is easily attached to the lathe.

A still further objective of this invention is the provision of a laser-based jaw setting device, which is easily released from the lathe.

Another objective of this invention is the provision of a laser-based jaw setting device, capable of duplicating a jaw setting.

Yet another objective of this invention is the provision of a laser-based jaw setting device, capable of permitting substantially exact replacement of work holding jaws on the lathe.

Still, another objective of this invention is the provision of a laser-based jaw setting device, which minimizes loss of product.

Also, an objective of this invention is the provision of a laser-based jaw setting device for an accurate work holding jaw placement on a lathe.

These and other objectives of the invention (which other objectives become clear by consideration of the specification, claims and drawings as a whole) are met by providing a laser-based jaw setting device with its components supported in a housing, the housing having a laser diode, an internal battery supply, and an operating switch mounted therein; and further having a main mounting plate secured to the housing in order to permit the laser-based jaw setting device to be releasably secured to a desired lathe.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

In order to reduce the time required to put a set of work holding jaws on a lathe, especially, a computer numeric controlled lathe, a laser positioning device is extremely useful. The laser positioning device greatly reduces the time to put a set of work holding jaws on a lathe, especially a computer numeric controlled lathe.

The size of the jaws for the lathe is adapted or designed to accommodate the proper size of the work piece to hold. The laser positioning device will aid a set up person with the installation of a set of jaws on a computer numeric controlled lathe so that the set of jaws is placed at the proper location on the chuck, thereby resulting in the proper positioning of the jaws on the lathe.

The laser positioning device includes a laser diode mounted in an aluminum housing with a power control switch and an internal battery supply. With a magnet mounted on the unit comprising the laser positioning device, the laser positioning device may be placed at a location on the turret of the computer numeric controlled lathe by the magnetic base, so as to shine the beam from the laser near the through aperture of the lathe. The through aperture of the lathe is adjacent to the chuck.

The turret can be hand wheeled down so as to set the diameter on the screen, when the laser beam contacts or touches an aperture having a known diameter. The known diameter is then punched, which is to say entered, into the computer numeric controlled lathe computer, so the setup person can know at what diameter the beam is set.

The set up person can then manually wheel or move the beam to the diameter of the piece or part, to which the jaws must be set. At this point, the jaws can now be placed on the chuck at the proper diameter. The orientation of the jaws is checked by spinning the chuck. In this fashion, the jaws are used to push off or start, rather than to stop the lathe.

Figure 1:
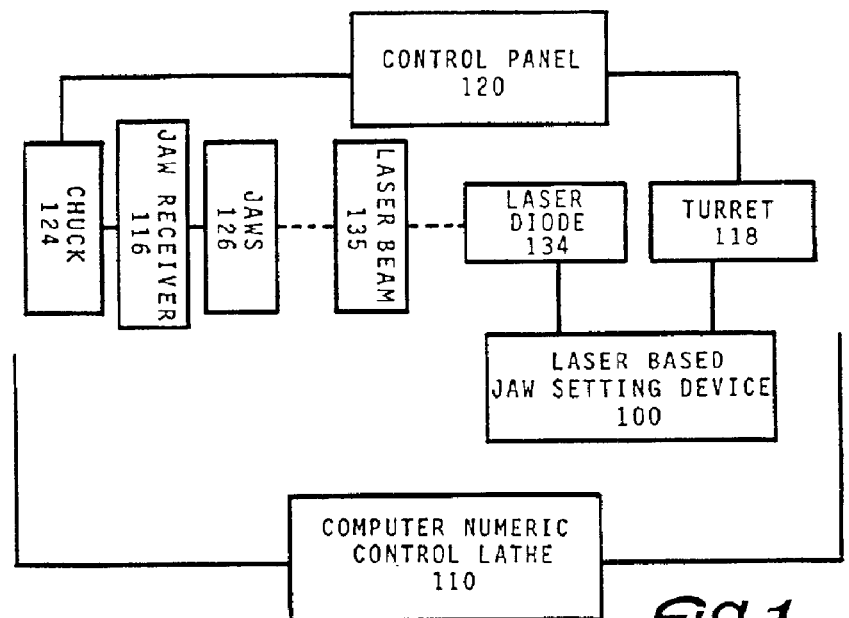
FIG. 1 depicts a block diagram of the laser-based jaw setting device 100 of this invention in use on a computer numeric controlled lathe 110.

Referring now to FIG. 1, in block diagram form, laser-based jaw setting device 100 is positioned in use on a computer numeric controlled lathe 110. Computer numeric controlled lathe 110 includes a chuck 124, which carries a jaw receiver 116 for jaws 126. Jaws 126 in turn hold work piece 128, which will be transformed into a desired product.

Figure 2:
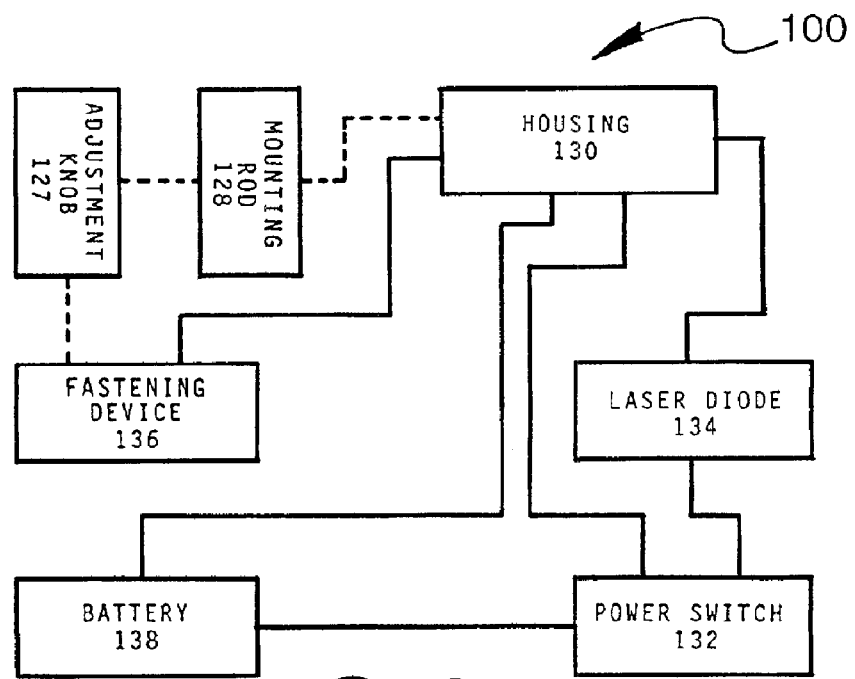
FIG. 2 depicts a block diagram of the laser-based jaw setting device 100 of this invention showing its component parts.
Figure 3:
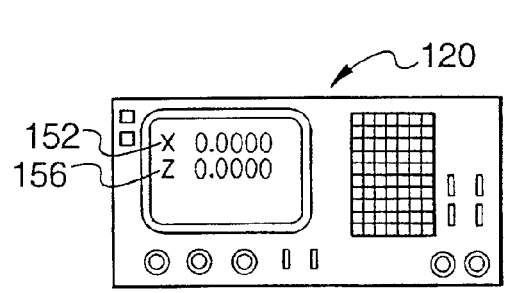
FIG. 3 depicts a plan view of the control panel 120 for a computer numeric controlled lathe 110, which may use the laser based jaw setting device 100 of this invention.
Figure 5:
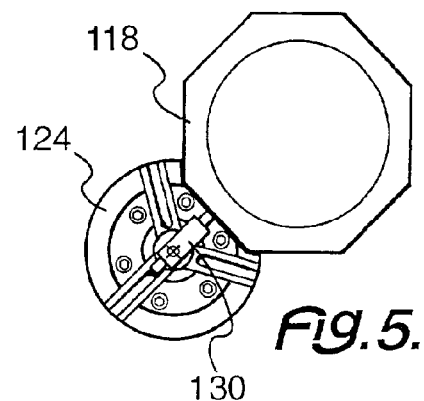
FIG. 5 depicts a front plan view of chuck 124 of the computer numeric controlled lathe 110.

With FIG. 2 laser-based jaw setting device 100 includes a housing 130. Within housing 130 are mounted a power switch 132, a laser diode 134 and a battery 138. Battery 138 is secured within housing 130 and connected in a standard fashion to both switch 132 and laser diode 134. Clearly both switch 132 and laser diode 134 are mounted therein also.

By operation of switch 132, laser diode 134 is activated as or when desired and permitted to direct a laser beam 135 (FIG. 4) from housing 130 to a desired point on the lathe 110. Fastening device 136 is typically a magnet or other device suitable for releasably attaching the laser-based jaw setting device 100 to the lathe 110. Thus, the laser-based jaw setting device 100 can easily be moved from one of lathe 110 to another.

The chuck 124 and items carried thereon cooperates with a turret 118. The turret 118 provides the mounting point for laser-based jaw setting device 100. Laser diode 134 in laser-based jaw setting device 100 projects a beam 135 from housing 130 onto jaw receiver 116, which guides an efficient setting of the jaws 126 on a lathe, such as computer numeric controlled lathe 110.

Adding FIG. 3, FIG. 4, FIG. 5, and FIG. 6 to the consideration, laser-based jaw setting device 100 includes a housing 130. Mounted in the housing 130 is a power switch 132 operably connected to a laser diode 134, also mounted therein. With power switch 132 operably connected to a laser diode 134 and powered by an appropriate battery 138 or other portable power source, laser-based jaw setting device 100 is ready for use.

With a fastening device 136 on the housing 130, the laser-based jaw setting device 100 is mounted on the turret 118. The fastening device 136 is typically a magnet. The fastening device 136 may be directly and permanently or substantially permanently secured to housing 130 (FIG. 2).

Figure 4:
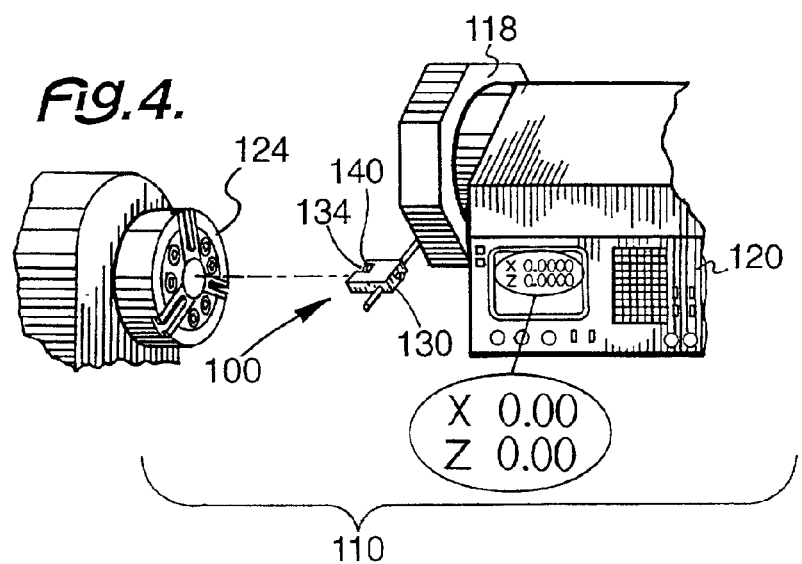
FIG. 4 depicts a perspective view of the laser-based jaw setting device 100 on a computer numeric controlled lathe 110.
Figure 6:
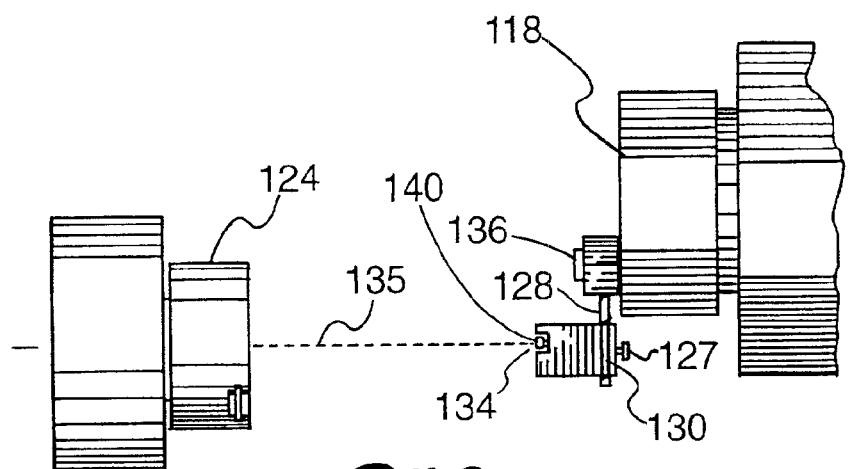
FIG. 6 depicts a side view of the laser-based jaw setting device 100 on a computer numeric controlled lathe 110.

Alternatively, the housing 130 may be mounted on a holding rod 128. Adjustment knob 127 is usually in threaded relation with fastening device 136 as it is slidable mounted on holding rod 128, and can releasably fix fastening device 136 in a desired position. The holding rod 128 receives the housing 130 at one end thereof and the fastening device 136 at the opposing end (FIG. 2 and FIG. 4).

For any typical use, a laser beam 135 from laser diode 134 passes through housing aperture 140 onto a desired site. From the turret 118, the laser diode 134 may shine a laser beam 135 to and through housing aperture 140 of housing 130 onto the chuck 124 of the lathe 110. With the beam 135, from laser diode 134 so focused on the chuck 124, jaws 126 may be secured thereto in a proper fashion, in a substantially reduced time.

Figure 7:
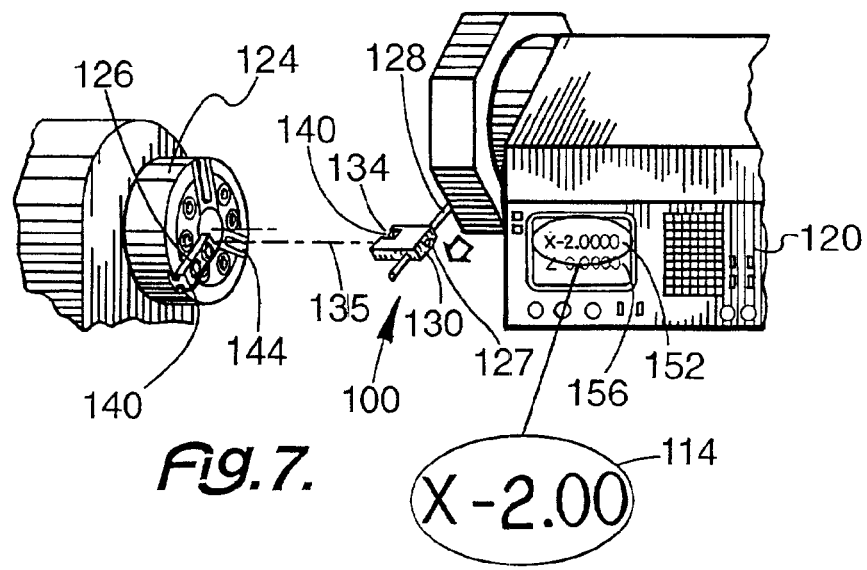
FIG. 7 depicts a perspective view of the laser-based jaw setting device 100 on a computer numeric controlled lathe 110, setting x axis 114.
Figure 8:
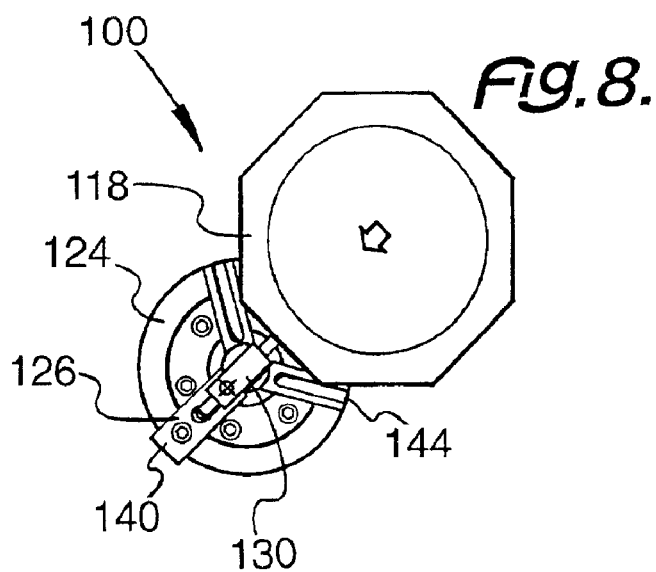
FIG. 8 depicts a front plan view of chuck 112 based on FIG. 6.
Figure 9:
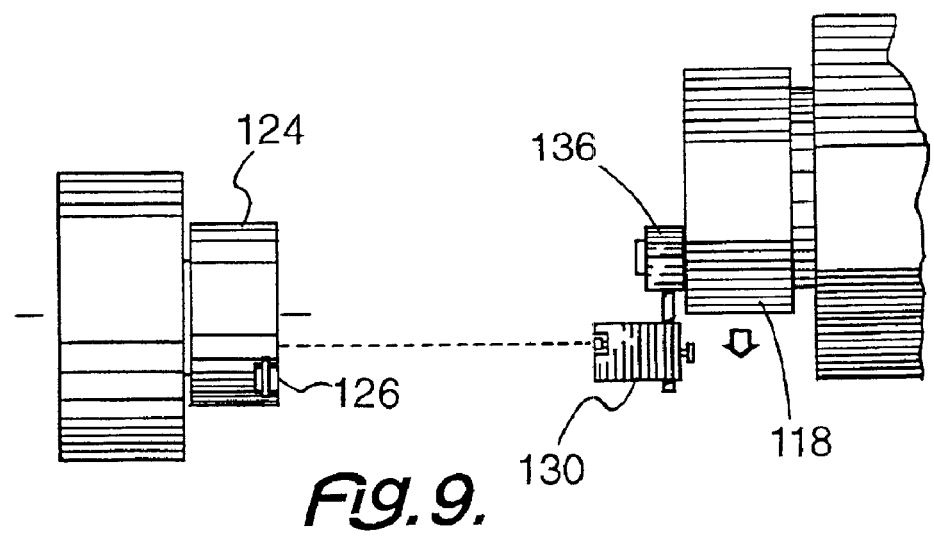
FIG. 9 depicts a side view of the computer numeric controlled lathe 110 based on FIG. 7.

With the further consideration of FIG. 7, FIG. 8, and FIG. 9, the alignment of jaws 126 are chuck 124 becomes more clear. The jaws 126 include an alignment x-axis 148 and an alignment z-axis 150. With the alignment of x-axis 148 in proper relationship with the laser 134, is permitted to put the jaws 126 in the chuck 124, with good alignment.

Control panel 130 provides an x-axis readout 152 and a z-axis readout 156 for each of alignment x-axis 148 and alignment z-axis 150. With the alignment of the x-axis 148 in proper relationship, the jaws 126 can be placed and mounted appropriately. The alignment z-axis 150 assists with the production of the desired product.

Laser diode 134, by proper aiming, permits jaws 126 to be placed on chuck 124 in perfect alignment. With the target precision of the laser diode 134, jaws 126 are placed on the lathe 112 and an accurate position, thereby permitting the work piece 128 to be placed on lathe 110 accurately.

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. A laser-based jaw setting device comprising:
   (a) a housing for the laser-based jaw setting device supporting elements thereof;
   (b) a laser diode for the laser-based jaw setting device being mounted in the housing;
   (c) a portable power supply for the laser diode for the laser-based jaw setting device being mounted in the housing,
   (d) an operating switch for the laser diode for the laser-based jaw setting device being mounted in the housing; [and]
   (e) the operating switch being interconnected with the laser diode and the portable power supply;
   (f) a mounting device being secured the housing to a lathe; and
   (g) the mounting device releasably securing the housing to a lathe in order to permit thin laser-based jaw setting device to assist placement of work jaws on the lathe.

2. The laser-based jaw setting device of claim 1 further comprising:
   (a) a laser beam opening being situated in the housing in order for a laser beam from the laser diode to pass therethrough to the lathe;

(b) the operating switch serving to turn, the laser diode off or on.

3. The laser-based jaw setting device of claim 2 further comprising
   (a) the mounting device being a magnet; and
   (b) the magnet releasably securing the housing mounting device releasably securing the housing to a turret of the lathe.

4. The laser-based jaw setting device of claim 2 further comprising:
   (a) the magnet being substantially permanently secured to the housing; and
   (b) the laser-based jaw setting device permitting laser being from the laser diode to focus on a jaw receiver of the lathe.

5. The laser-based jaw setting device of claim 4 further comprising:
   (a) a mounting device securing the housing to the computer numeric controlled lathe; and
   (b) the mounting device including a holding rod;
   (c) the holding rod receiving the housing at a first rod end thereof;
   (d) the holding rod receiving a magnet assembly at a second rod end thereof;
   (e) the first rod end being oppositely disposed from the second rod end; and
   (f) the magnet assembly cooperating with the rod thereby releasably attaching the housing to the computer numeric controlled lathe in order to permit the laser-based jaw setting device to assist placement of work jaws on the lathe.

6. The laser-based jaw setting device of claim 5 further comprising:
   (a) a laser beam opening being situated in the housing in order for the laser beam to pass therethrough to the lathe; and
   (b) the operating switch serving to turn the laser diode off or on.

7. The laser-based jaw setting device of claim 6 further comprising:
   (a) the mounting device being a magnet; and
   (b) the magnet releasably securing the housing mounting device releasably securing the housing to a turret of the lathe.

8. In a computer numeric controlled lathe, having a turret and a chuck with a jaw receiver thereon and a chuck aperture therein having a control panel in order to operate the computer numeric controlled lathe, the improvement comprising a laser-based jaw setting device providing assistance in mounting a set of jaws on the chuck, the laser-based jaw setting device:
   (a) a housing for the laser-based jaw setting device supporting elements thereof;
   (b) a laser diode for the laser-based jaw setting device being mounted in the housing;
   (c) a portable power supply for the laser diode for the laser-based jaw setting device being mounted in the housing;
   (d) an operating switch for the laser diode for the laser-based jaw setting device being mounted in the housing; and
   (e) the operating switch being interconnected with the laser diode and the portable power supply.

9. The computer numeric controlled lathe of claim 8 including:
   (a) a mounting device securing the housing to the computer numeric controlled lathe; and
   (b) the mounting device releasably securing the housing to the computer numeric controlled lathe in order to permit the laser-based jaw setting device to assist placement of work jaws on the lathe.

10. The computer numeric controlled lathe of claim 9 including:
    (a) a laser beam opening being situated in the housing in order for the laser beam to pass therethrough to the lathe;
    (b) the operating switch serving to turn the laser diode off or on.

11. The computer numeric controlled lathe or claim 10 including:
    (a) the mounting device being a magnet; and
    (b) the magnet releasably securing the housing mounting device releasably securing the housing to a turret of the lathe.

12. The computer numeric controlled lathe of claim 11 including:
    (a) the magnet being substantially permanently secured to the housing; and
    (b) the laser-based jaw setting device permitting the laser beam from the laser diode to focus on a jaw receiver of the lathe.

13. The computer numeric controlled lathe of claim 9 including:
    (a) a mounting device securing the housing to the computer numeric controlled lathe; and
    (b) the mounting device including a holding rod,
    (c) the holding rod receiving the housing at a first rod end thereof;
    (d) the holding rod receiving a magnet assembly at a second rod end thereof;
    (e) the first rod end being oppositely disposed from the second rod end, and
    (f) the magnet assembly cooperating with the rod thereby releasably attaching the housing to the computer numeric controlled lathe in order to permit the laser-based jaw setting device to assist placement of work jaws on the lathe.

14. The computer numeric controlled lathe of claim 13 including:
    (a) a laser beam opening being situated in the housing in order for the laser beam to pass therethrough to the lathe, and
    (b) the operating switch serving to turn the laser diode off or on.

15. The computer numeric controlled lathe of claim 14 including:
    (a) the mounting device being a magnet; and
    (b) the magnet releasably securing the housing mounting device releasably securing the housing to a turret of the lathe.

16. A method for mounting a set of work piece holding jaws on a lathe having a turret and a chuck with a jaw receiver thereon and a chuck aperture, comprising:
    (a) positioning a laser-based jaw setting device with a laser diode therein on the turret;
    (b) shining a beam from the laser diode near a through aperture of the lathe, the through aperture of the lathe being adjacent to the chuck;
    (c) moving the turret so that the laser beam contacts an aperture having a known diameter;

(d) determining a proper, substantially repeatable position for the set of work piece holding jaws on the lathe; and (e) placing the set of work piece holding jaws on the lathe in order to permit a work piece to be received within the set of work piece holding jaws.

17. The method of claim 16 further comprising:

(a) the lathe being a computer numeric controlled lathe;

(b) the laser beam serving to assist in the determination of an alignment x-axis for the set of work piece holding jaws; and (c) the set of work piece holding jaws being secured to the chuck pursuant to the alignment x-axis.

18. The method of claim 17 further comprising:

(a) a control panel for the computer numeric controlled lathe providing an x-readout for the alignment x-axis;

(b) the control panel providing additional information for placement of work piece holding jaws;

(c) the laser-based jaw setting device permitting the set of work piece holding jaws to be placed on the computer numeric controlled lathe in a first position;

(d) the laser-based jaw setting device permitting the set of work piece holding jaws to be placed on the computer numeric controlled lathe in a second position; and (e) the first position being substantially similar to the second position.

* * * * *